United States Patent
Chen et al.

(10) Patent No.: US 9,219,554 B2
(45) Date of Patent: Dec. 22, 2015

(54) POWER DETECTION METHOD AND RELATED COMMUNICATION DEVICE

(71) Applicant: MEDIATEK INC., Hsin-Chu (TW)

(72) Inventors: Hsin-Hung Chen, Hsinchu County (TW); Hsiang-Hui Chang, Miaoli County (TW); Dimitris Nalbantis, West Malling (GB); Bernard Mark Tenbroek, West Malling (GB)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/744,385

(22) Filed: Jan. 17, 2013

(65) Prior Publication Data

US 2013/0188675 A1 Jul. 25, 2013

Related U.S. Application Data

(60) Provisional application No. 61/589,035, filed on Jan. 20, 2012, provisional application No. 61/642,637, filed on May 4, 2012.

(51) Int. Cl.
| | | |
|---|---|---|
| *H04B 1/38* | (2015.01) | |
| *H04B 17/00* | (2015.01) | |
| *H04B 17/14* | (2015.01) | |
| *H04B 17/24* | (2015.01) | |

(52) U.S. Cl.
CPC ............ *H04B 17/0067* (2013.01); *H04B 17/14* (2015.01); *H04B 17/24* (2015.01)

(58) Field of Classification Search
CPC ............. H03C 5/00; H04B 2001/0433; H04B 2001/0425; H04L 27/368; H03L 7/085; H03D 1/00; H03K 7/00
USPC .................................. 375/219–222, 296, 297
See application file for complete search history.

(56) References Cited

U.S. PATENT DOCUMENTS

| | | | |
|---|---|---|---|
| 7,409,004 B2 | 8/2008 | Booth | |
| 7,596,184 B2 | 9/2009 | Ahmed | |
| 7,599,669 B2 | 10/2009 | Boos | |
| 7,817,970 B2 | 10/2010 | Puma | |
| 2007/0190952 A1* | 8/2007 | Waheed et al. ............. | 455/114.3 |
| 2008/0175593 A1* | 7/2008 | Li ................... | 398/116 |
| 2008/0225981 A1* | 9/2008 | Reddy et al. .................. | 375/297 |
| 2009/0004981 A1* | 1/2009 | Eliezer et al. ............... | 455/127.1 |
| 2009/0196223 A1 | 8/2009 | Nalbantis | |
| 2011/0250853 A1* | 10/2011 | Camuffo et al. ................. | 455/75 |

FOREIGN PATENT DOCUMENTS

| | | |
|---|---|---|
| CN | 101364968 A | 2/2009 |
| CN | 101729080 A | 6/2010 |

* cited by examiner

*Primary Examiner* — Don N Vo
(74) *Attorney, Agent, or Firm* — Winston Hsu; Scott Margo

(57) ABSTRACT

A communication device with a power detection scheme is disclosed. The communication device includes a transmitter for transmitting an RF signal, a demodulator for demodulating the RF signal by utilizing a phase-modulated (PM) signal provided from the transmitter to generate a demodulated signal, a loopback circuit coupled between the transmitter and the demodulator for transmitting the RF signal and the PM signal from the transmitter to the demodulator when the power detection scheme is enabled, and a power detector for detecting power of the demodulated signal.

18 Claims, 7 Drawing Sheets

United States Patent US 9,219,554 B2

POWER DETECTION METHOD AND RELATED COMMUNICATION DEVICE

CROSS REFERENCE TO RELATED APPLICATIONS

This application claims the benefit of U.S. provisional application No. 61/589,035, filed on Jan. 20, 2012 and the benefit of U.S. provisional application No. 61/642,637, filed on May 4, 2012, and incorporated herein by reference.

BACKGROUND

The invention relates to a power detection method and related communication device, and more particularly, to a power detection method and related communication device that detects power of RF signal without any oscillator in the demodulator, so as to save hardware costs of the communication device.

A communication device may alternatively use polar transmitter for communication systems such as Global System for Mobile Communications (GSM) and Enhanced Data Rates for GSM Evolution (EDGE) instead of using direct-conversion transmitter (DCT). A polar transmitter offers some advantages, such as a potential for reducing complexity and current consumption in the modulator path as well as eliminating the problem of image rejection, thus the polar transmitter is more suitable for implementation in advanced complementary metal oxide semiconductor (CMOS) processing technologies. More specifically, the polar transmitter is a transmitting device that splits a complex baseband signal explicitly represented by an amplitude-modulated (AM) contented component and a phase-modulated (PM) contented component, instead of an in-phase component and a quadrature component. These two components are then recombined into a radio-frequency (RF) output to be transmitted over the air. For example, an all-digital phase locked loop (ADPLL) may be disposed in a phase modulating path to generate a PM signal, such as a clock output of a digitally-controlled oscillator (DCO), in response to the PM contented component, and the frequency/phase modulated clock is processed by a following stage such as a digitally-controlled power amplifier (DPA).

In the communication device, the transmitter and the demodulator may be connected for power detection of RF signal by utilizing a loopback circuit. Please refer to FIG. 1, which is a schematic diagram of a communication device 10 with power detection scheme according to the related art. The communication device 10 includes a transmitter 100, a demodulator 102 and a loopback circuit 104. The transmitter 100 is used for transmitting an RF signal RF_sig, which includes a PM contented component and an AM contented component. The RF signal RF_sig is transmitted to the demodulator 102 through the loopback circuit 104. The demodulator 102 is used for demodulating the RF signal RF_sig, so as to obtain power information corresponding to the RF signal RF_sig for power calibration. However, in the related art, an oscillator is required in the demodulator 102 to correctly demodulate the RF signal RF_sig, such that the hardware cost of the communication device 10 rises.

SUMMARY

It is therefore a primary objective of the claimed invention to provide a power detection method and related communication device.

The present invention discloses a communication device with a power detection scheme, including a transmitter for transmitting an RF signal; a demodulator for demodulating the RF signal by utilizing a phase-modulated (PM) signal provided from the transmitter to generate a demodulated signal; a loopback circuit coupled between the transmitter and the demodulator for transmitting the RF signal and the PM signal from the transmitter to the demodulator when the power detection scheme is enabled and a power detector, for detecting power of the demodulated signal.

The present invention further discloses a communication device, including a transmitter for transmitting an RF signal; a demodulator for demodulating the RF signal by utilizing a phase-modulated (PM) signal provided from the transmitter to generate a demodulated signal; and a loopback circuit coupled between the transmitter and the demodulator for transmitting the RF signal and the PM signal from the transmitter to the demodulator.

The present invention further discloses a power detection method for a communication device with a power detection scheme, the communication device including a transmitter and a demodulator, the method including transmitting an RF signal by the transmitter; transmitting the RF signal and a phase-modulated (PM) signal provided from the transmitter to the demodulator by utilizing a loopback circuit coupled between the transmitter and the demodulator when the power detection scheme is enabled; demodulating the RF signal to generate a demodulated signal by utilizing the PM signal; and detecting power of the demodulated signal.

The present invention further discloses an operating method for a communication device with a power detection scheme, the communication device including a transmitter and a demodulator, the method including transmitting an RF signal by the transmitter; transmitting the RF signal and a phase-modulated (PM) signal provided from the transmitter to the demodulator by utilizing a loopback circuit coupled between the transmitter and the demodulator; and demodulating the RF signal to generate a demodulated signal by utilizing the PM signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
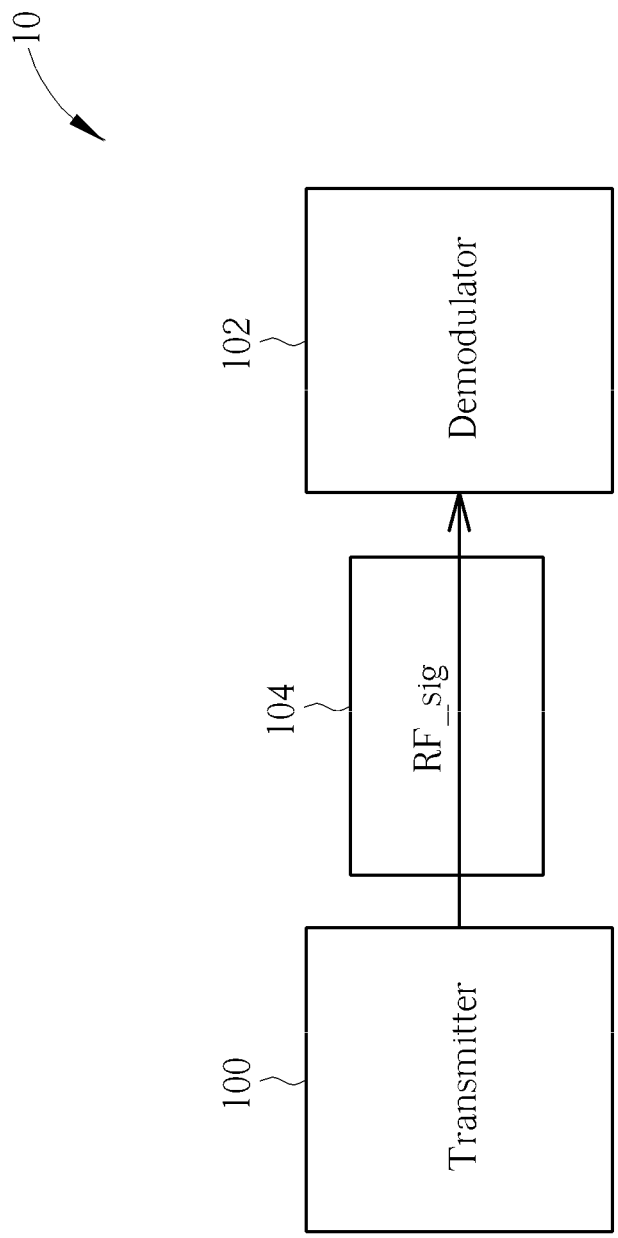
FIG. 1 is a schematic diagram of a communication device according to the related art.
Figure 2:
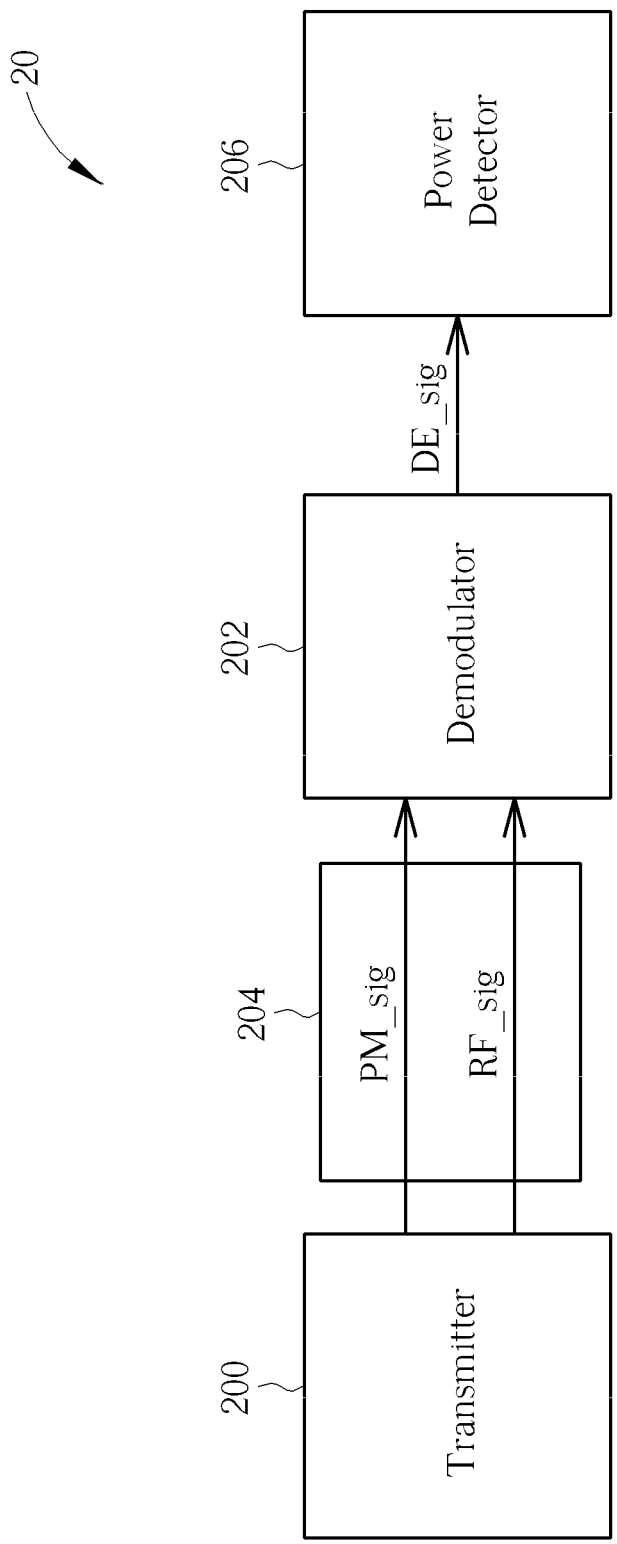
FIG. 2 is a schematic diagram of a communication device according to an embodiment of the present invention.

Please refer to FIG. 2, which is a schematic diagram of a communication device 20 with a power detection scheme according to an exemplary embodiment of the present invention. The communication device 20 includes a transmitter 200, a demodulator 202, a loopback circuit 204 and a power detector 206. The transmitter 200 is used for transmitting an RF signal. The demodulator 202 is used for demodulating the RF signal RF_sig into a demodulated signal DE_sig by utilizing the PM signal PM_sig, which is provided from the transmitter 200. The loopback circuit 204 is responsible of transmitting the RF signal RF_sig and the PM signal PM_sig from the transmitter 200 to the demodulator 202 when the power detection scheme is enabled. The power detector 206 is used for detecting power of the demodulated signal DE_sig.

Figure 3:
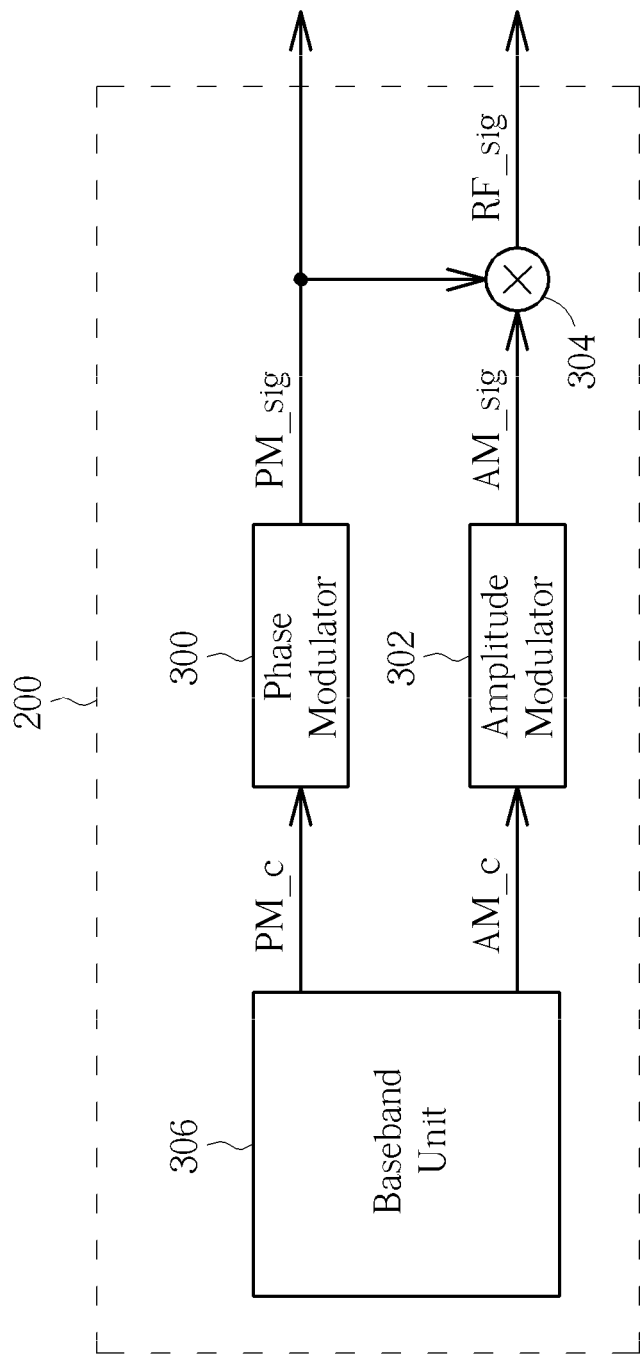
FIG. 3 is an exemplary schematic diagram of the transmitter shown in FIG. 2.

For implementation of the transmitter 200, please refer to FIG. 3, which is an exemplary schematic diagram of the transmitter 200 shown in FIG. 2. In FIG. 3, the transmitter 200 includes a phase modulator 300, an amplitude modulator 302, a mixer 304 and a baseband unit 306. The phase modulator 300 is used for generating the PM signal PM_sig according to a PM contented component PM_c, and the amplitude modulator 302 is used for generating an AM signal AM_sig according to an AM contented component AM_c. The PM contented component PM_c and the AM contented component AM_c form a polar coordinate system. The phase modulator 300 includes a phase-lock loop (PLL) for modulating the PM contented component PM_c into the PM signal PM_sig with frequency $\omega_c/2\pi$. The amplitude modulator 302 includes a digital-to-analog converter for converting the AM contented component AM_c into the AM signal AM_sig. The mixer 304 is used for upconverting the PM signal PM_sig and the AM signal AM_sig into the RF signal RF_sig.

Note that, the PM contented component PM_c and the AM contented component AM_c may be generated from a baseband unit 306 or a processor (not shown). If the baseband unit 306 has the ability to generate the PM contented component PM_c and the AM contented component AM_c, the baseband unit 306 outputs the PM contented component PM_c to the phase modulator 300 and outputs the AM contented component AM_c to the amplitude modulator 302. Otherwise, if the baseband unit 306 generates in-phase and quadrature contented components of a Cartesian coordinate system rather than the PM contented component PM_c and the AM contented component AM_c, the transmitter 200 may further include a processor (not shown) for converting the in-phase and quadrature contented components into the PM contented component PM_c and the AM contented component AM_c (i.e. from the Cartesian coordinate system to the polar coordinate system). For example, the processor (not shown) may apply a Coordinate Rotation Digital Computer (CORDIC) algorithm for converting the Cartesian coordinate system into the polar coordinate system.

According to one embodiment, the AM signal AM_sig is arranged to be a constant voltage level when the transmitter 200 is operated in DFM (direct frequency modulation) mode for GSM system. In one example, the baseband unit 306 can directly output a non-amplitude-modulated signal (e.g., a DC signal) as the AM signal AM_sig. In another example, a multiplexer (not shown) can be utilized for selectively outputting a non-amplitude-modulated signal (e.g., a DC signal) or a modulated signal (e.g., the AM signal AM_sig), which depends on which modulation mode the transmitter 200 operates in. For example, if the transmitter 200 is operated by a constant envelope modulation (e.g., the DFM mode for GSM system), the multiplexer (not shown) outputs the DC signal in replace of the AM signal AM_sig. Otherwise, if the transmitter 200 is operated by a non-constant envelope modulation (e.g., polar mode for EDGE system), the multiplexer (not shown) outputs the modulated AM signal AM_sig generated from the baseband unit 306. That is, the transmitter used in the embodiments of the present invention can utilize either the non-constant envelop modulation (using both AM and PM signals) or the constant envelop modulation (using the PM signal only).

The RF signal RF_sig is time-variant and can be denoted as a function $V_{RF}(t)$. The function $V_{RF}(t)$ is expressed as the following equation (Eq. 1):

$$V_{RF}(t)=V_{AM}(t)\cdot\cos(\omega_c t+\phi(t)),  \quad (Eq. 1)$$

where $V_{AM}(t)$ is the function of the AM signal AM_sig, and $\cos(\omega_c(t+\phi(t)))$ is the function of the PM signal PM_sig. The PM signal PM_sig is generated with frequency $\omega_c/2\pi$ and contains phase information $\phi(t)$ (i.e. PM contented component PM_c). In a condition that the transmitter is operated by the constant envelope modulation, since the AM signal AM_sig is a constant, the function $V_{AM}(t)$ can be further denoted as $V_{AM}$.

Figure 4:
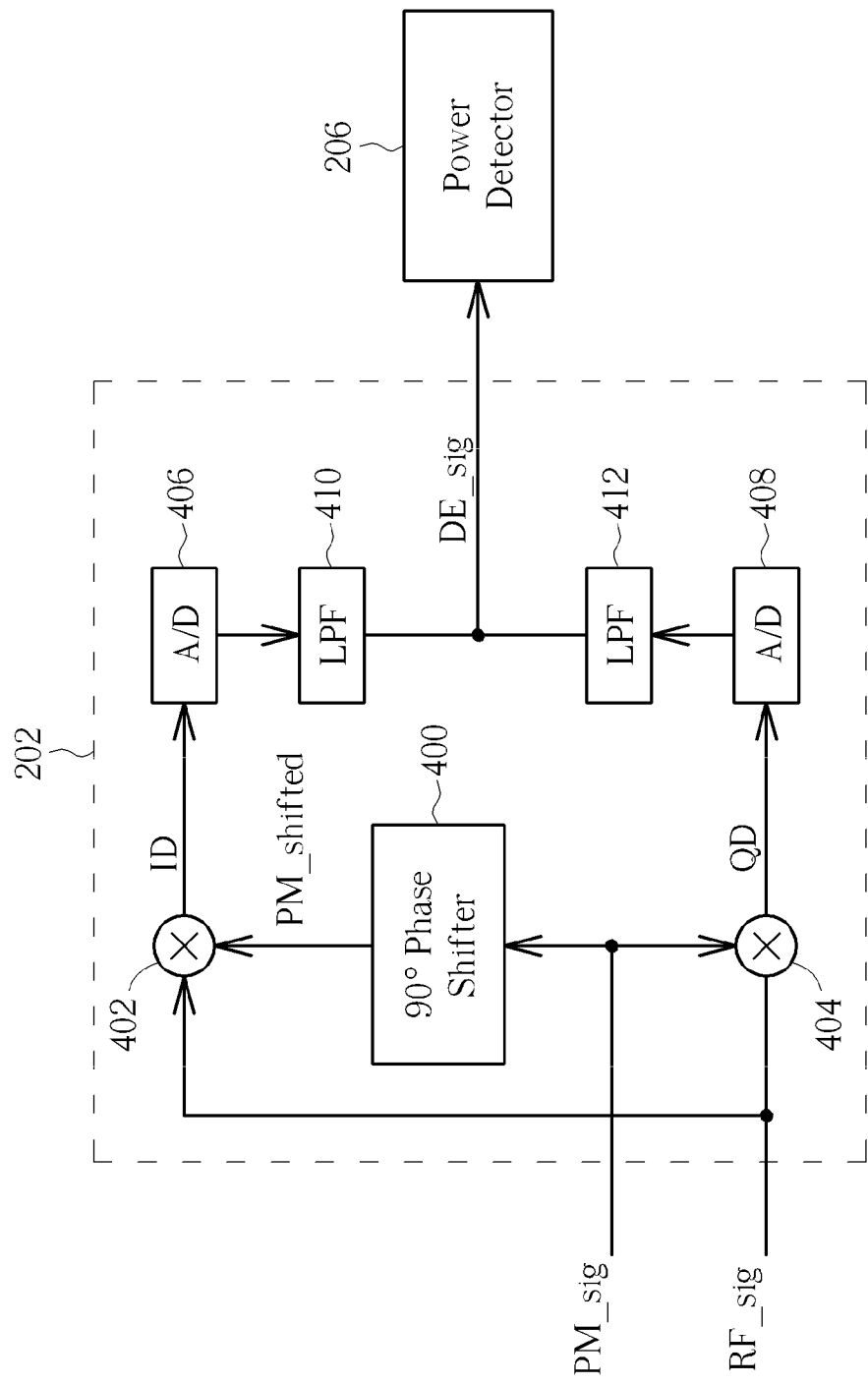
FIG. 4 is an exemplary schematic diagram of the demodulator shown in FIG. 2.

Please refer to FIG. 4, which is an exemplary schematic diagram of the demodulator 202 shown in FIG. 2. In FIG. 4, the demodulator 202 includes a 90-degree phase shifter 400, mixers 402, 404, analog-to-digital (A/D) converters 406, 408 and low-pass filters (LPFs) 410, 412. The 90-degree phase shifter 400 is used for shifting a phase of the PM signal PM_sig into a shifted PM signal PM_shifted. The mixer 402 mixes the RF signal RF_sig and the shifted PM signal PM_shifted into an in-phase demodulated component ID. The mixer 404 mixes the RF signal RF_sig and the PM signal PM_sig into a quadrature demodulated component QD. The A/D converters 406, 408 are used for converting the in-phase demodulated component ID and the quadrature demodulated component QD from analog to digital, respectively. The LPF 410 is used for low-pass filtering of the in-phase demodulated component ID, and the LPF 412 is used for low-pass filtering of the quadrature demodulated component QD. After low-pass filtering, the power detector 206 detects power of the in-phase component ID and the quadrature component QD. The in-phase component ID and the quadrature component QD are combined into the demodulated signal DE_sig.

In detail, the power detector 206 first combines the in-phase demodulated component ID into the demodulated signal DE_sig and the filtered quadrature component QD and then detects power by calculating root-mean-square (RMS) value thereof. The demodulated signal DE_sig can be denoted as $V_{RX}(t)$, which is expressed as the following equation (Eq. 2):

$$\begin{aligned}V_{RX}(t) &= V_{RF}(t)\cdot(\cos(\omega_c t+\phi(t))+j\sin(\omega_c t+\phi(t))) \quad (Eq.\ 2)\\ &= V_{AM}(t)\cdot\cos(\omega_c t+\phi(t))\cdot\begin{pmatrix}\cos(\omega_c t+\phi(t))+\\ j\sin(\omega_c t+\phi(t))\end{pmatrix}\\ &= \frac{V_{AM}(t)}{2}\cdot[\cos(0)+\cos(2\omega_c t+2\phi(t))]+\end{aligned}$$

-continued $$j\frac{V_{AM}(t)}{2} \cdot [-\sin(0) + \sin(2\omega_c t + 2\phi(t))].$$

After low-pass filtering, the function $V_{RX}(t)$ becomes as the following equation (Eq. 3):

$$V_{RX}(t) \stackrel{LPF}{=} \frac{V_{AM}(t)}{2} \cdot \cos(0) \qquad (\text{Eq. 3})$$
$$= \frac{V_{AM}(t)}{2}.$$

Because no random variable exists in the equation (Eq. 3), the RMS value of the function $V_{RX}(t)$ is still $V_{AM}(t)/2$. Therefore, the power of the RX signal RX_sig can be detected accordingly for power calibration.

In another case that the PM signal PM_sig is delayed by a delay unit (not shown) with phase delay coefficient $\phi_d$ in the loopback circuit 204, the function $V_{RX}(t)$ is modified to be expressed as the following equation (Eq. 4):

$$V_{RX}(t) = V_{RF}(t) \cdot (\cos(\omega_c t + \phi(t) + \phi_d) + j\sin(\omega_c t + \phi(t) + \phi_d)) \qquad (\text{Eq. 4})$$
$$= V_{AM}(t) \cdot \cos(\omega_c t + \phi(t)) \cdot \begin{pmatrix} \cos(\omega_c t + \phi(t) + \phi_d) + \\ j\sin(\omega_c t + \phi(t) + \phi_d) \end{pmatrix}$$
$$= \frac{V_{AM}(t)}{2} \cdot [\cos(\phi_d) + \cos(2\omega_c t + 2\phi(t))] +$$
$$j\frac{V_{AM}(t)}{2} \cdot [-\sin(\phi_d) + \sin(2\omega_c t + 2\phi(t))].$$

After low-pass filtering, the function $V_{RX}(t)$ becomes as the following equation (Eq. 5):

$$V_{RX}(t) \stackrel{LPF}{=} \frac{V_{AM}(t)}{2} \cdot \cos(\phi_d) - j\frac{V_{AM}(t)}{2} \cdot \sin(\phi_d), \qquad (\text{Eq. 5})$$

and the RMS value of the function $V_{RX}(t)$ is as the following equation (Eq. 6):

$$V_{RX}(t) \stackrel{RMS}{=} \sqrt{\text{mean}\begin{bmatrix} \frac{V_{AM}^2(t)}{4} \cdot \cos^2(\phi_d) + \\ \frac{V_{AM}^2(t)}{4} \cdot \sin^2(\phi_d) - \\ 2j \cdot \sin(\phi_d) \cdot \cos(\phi_d) \end{bmatrix}} \qquad (\text{Eq. 6})$$
$$= \sqrt{\frac{V_{AM}^2(t)}{4} \cdot [\cos^2(\phi_d) + \sin^2(\phi_d)]}$$
$$= \frac{V_{AM}(t)}{2}.$$

From equation (Eq. 6), the RMS value of the function $V_{RX}(t)$ is $$\frac{V_{AM}(t)}{2},$$

which is the same as that without delay. Therefore, the power of the RF signal RF_sig can be correctly detected regardless of whether the phase delay coefficient $\phi_d$ is introduced to the PM signal PM_sig in the loopback circuit.

Figure 5:
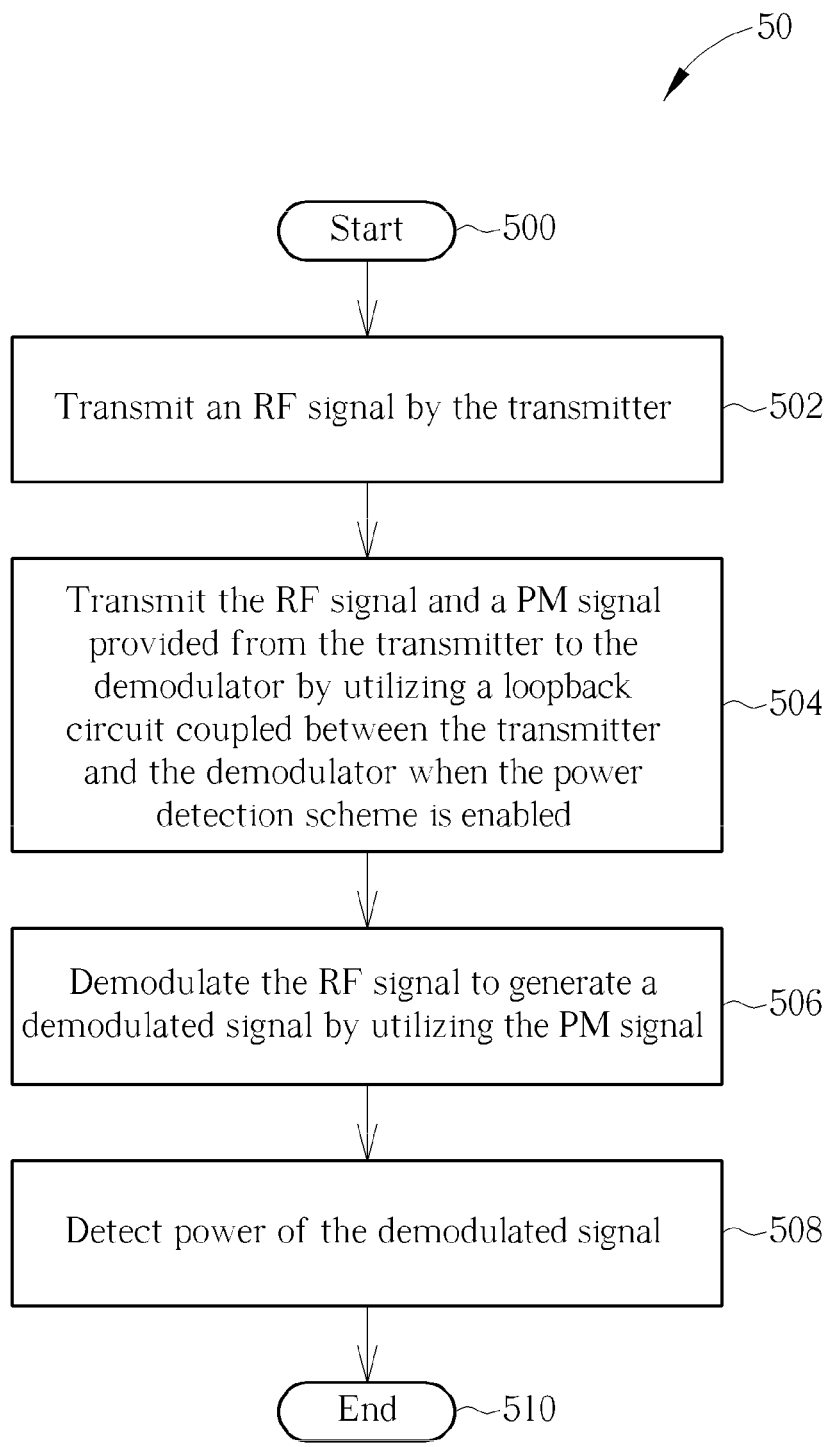
FIG. 5 is a flowchart diagram of a loop detection process according to an embodiment of the present invention.
Figure 6:
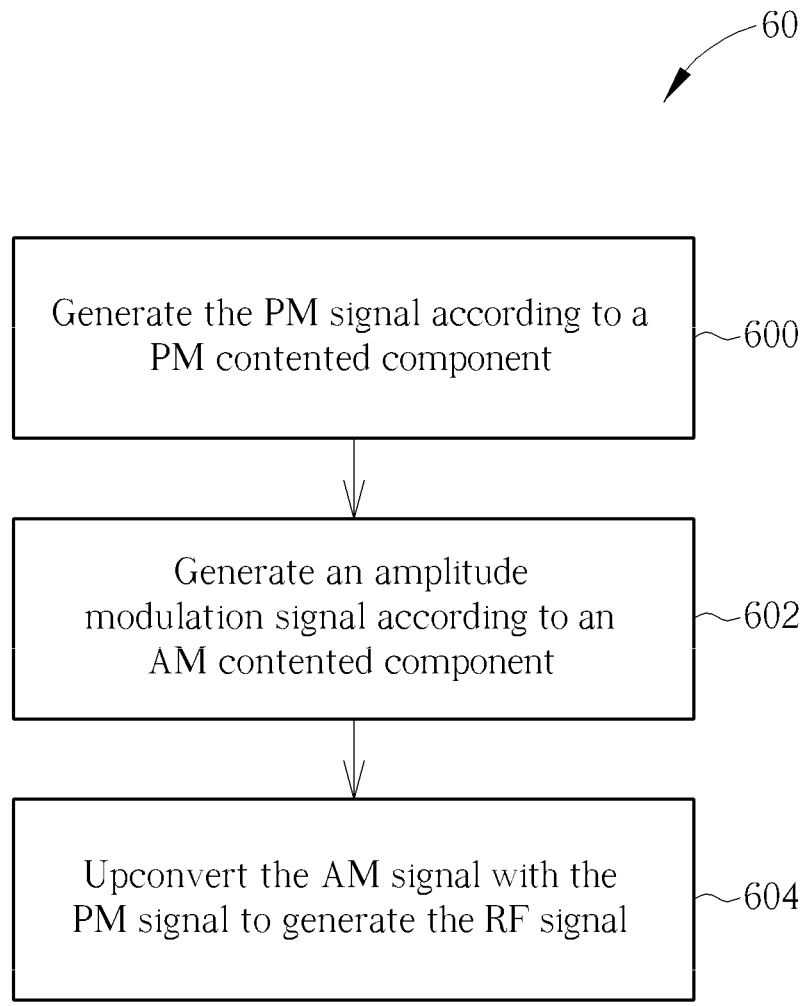
FIG. 6 is a flowchart diagram of Step 502 shown in FIG. 5.
Figure 7:
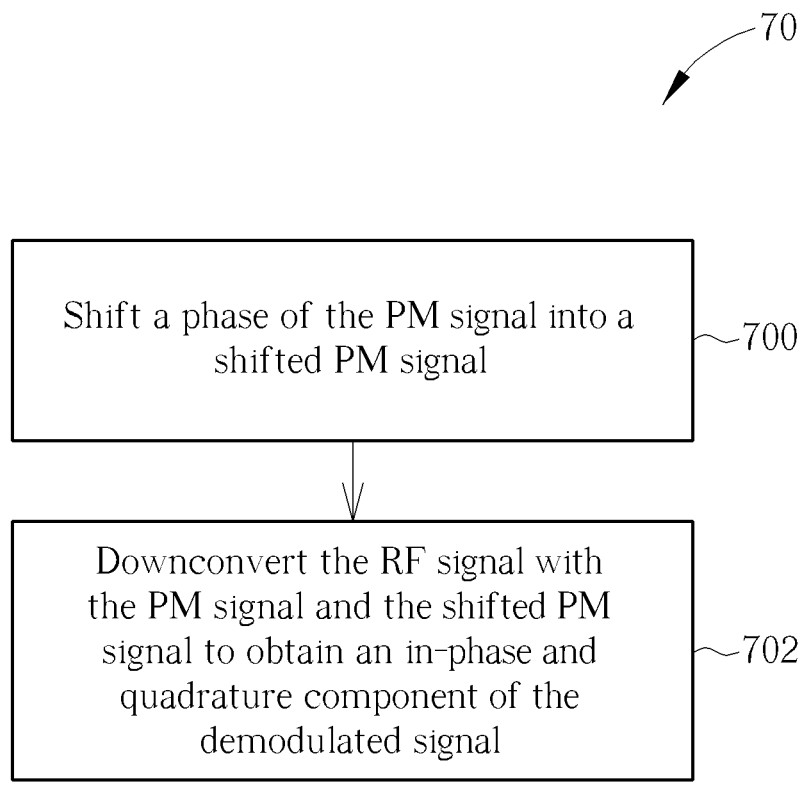
FIG. 7 is a flowchart diagram of Step 506 shown in FIG. 5.

Please refer to FIG. 5, which is a flowchart diagram of a loop detection process 50 according to an embodiment of the present invention. The loop detection process 50 is executed in the communication device 20 and includes the following steps:

Step 500: Start.
Step 502: Transmit an RF signal by the transmitter.
Step 504: Transmit the RF signal and a PM signal provided from the transmitter to the demodulator by utilizing a loopback circuit coupled between the transmitter and the demodulator when the power detection scheme is enabled.
Step 506: Demodulate the RF signal to generate a demodulated signal by utilizing the PM signal.
Step 508: Detect power of the demodulated signal.
Step 510: End.

Step 502, Step 504, Step 506 and Step 508 are performed in the transmitter 200, the loopback circuit 204, the demodulator 202 and the power detector 206, respectively. In Step 502, the RF signal is RF_sig composed of AM signal AM_sig and PM signal PM_sig. In detail, Step 502 can be expressed as a process 60 which includes the following steps:

Step 600: Generate the PM signal according to a PM contented component.
Step 602: Generate an amplitude modulation signal according to an AM contented component.
Step 604: Upconvert the AM signal with the PM signal to generate the RF signal.

Similarly, Step 506 can be expressed as a process 70 which includes the following steps:

Step 700: Shift a phase of the PM signal into a shifted PM signal.
Step 702: Downconvert the RF signal with the PM signal and the shifted PM signal to obtain an in-phase and quadrature component of the demodulated signal.

Once the process 70 is performed, the in-phase and quadrature component of the demodulated signal are used for detecting power of the RF signal.

The communication devices of the above embodiments demodulate RF signal by utilizing the PM signal generated from its own transmitter without using a dedicated local oscillation signal generated from an oscillator, such that no additional oscillator is required at the demodulator of the communication device.

To sum up, the communication device and related power detection method according to the embodiments of the present invention can detect power of RF signal without additional oscillators for the demodulator, so as to save hardware costs, such as chip area, of the communication device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device with a power detection scheme, comprising:
    a transmitter, for transmitting an RF signal;
    a demodulator, for demodulating the RF signal, by utilizing a phase-modulated (PM) signal provided from the transmitter, to generate a demodulated signal;
    a loopback circuit, coupled between the transmitter and the demodulator, for transmitting the RF signal and the PM signal from the transmitter to the demodulator when the power detection scheme is enabled; and
    a power detector, coupled to the demodulator, for detecting power of the demodulated signal.

2. The communication device with a power detection scheme of claim 1, wherein the transmitter comprises:
- a phase modulator, for generating the PM signal according to a PM contented component;
- an amplitude modulator, for generating an amplitude modulated (AM) signal according to an AM contented component; and
- a first mixer, coupled to the phase modulator and the amplitude modulator, for upconverting the AM signal and the PM signal to generate the RF signal.

3. The communication device with a power detection scheme of claim 2, wherein the phase modulator comprises a phase-lock loop and the amplitude modulator comprises a digital-to-analog converter.

4. The communication device with a power detection scheme of claim 2, wherein the transmitter comprises:
- a processor, for converting signals from a specific coordinate system into a polar coordinate system to obtain the PM contented component and the AM contented component.

5. The communication device with a power detection scheme of claim 1, wherein the transmitter comprises:
- a first mixer, for upconverting an analog signal with the PM signal to generate the RF signal;
- wherein the analog signal is set to be at a constant voltage level.

6. The communication device with a power detection scheme of claim 5, wherein the transmitter further comprises:
- a multiplexer, for outputting a modulated signal to be the analog signal when the transmitter is operated by a non-constant envelope modulation, and outputting a DC voltage to be the analog signal when the transmitter is operated by a constant envelope modulation.

7. The communication device with a power detection scheme of claim 5, wherein the transmitter further comprises:
- a baseband unit providing a non-amplitude-modulated signal to be the analog signal when the transmitter is operated by a constant envelope modulation.

8. The communication device with a power detection scheme of claim 1, further comprising:
- a delay unit, coupled between the transmitter and the demodulator, for delaying the PM signal before the demodulation of the RF signal.

9. The communication device with a power detection scheme of claim 1, wherein the demodulator comprises:
- a 90-degree phase shifter, for shifting a phase of the PM signal into a shifted PM signal;
- a second and third mixer, for downconverting the RF signal with the PM signal and the shifted PM signal to obtain an in-phase and quadrature component of the demodulated signal.

10. A power detection method for a communication device with a power detection scheme, the communication device including a transmitter and a demodulator, the method comprising:
- transmitting an RF signal by the transmitter;
- transmitting the RF signal and a phase-modulated (PM) signal provided from the transmitter to the demodulator by utilizing a loopback circuit coupled between the transmitter and the demodulator when the power detection scheme is enabled;
- demodulating the RF signal to generate a demodulated signal by utilizing the PM signal; and
- detecting power of the demodulated signal.

11. The power detection method of claim 10, wherein transmitting an RF signal comprises:
- generating the PM signal according to a PM contented component;
- generating an amplitude modulation (AM) signal according to an AM contented component; and
- upconverting the AM signal and the PM signal to generate the RF signal.

12. The power detection method of claim 11, wherein the PM signal is generated by a phase-lock loop and the AM signal is generated by a digital-to-analog converter.

13. The power detection method of claim 11, wherein the PM contented component and the AM contented component are obtained by converting signals from a specific coordinate system into a polar coordinate system.

14. The power detection method of claim 10, wherein the RF signal is generated by upconverting an analog signal with the PM signal;
- wherein the analog signal is set to be at a constant voltage level.

15. The power detection method of claim 14, wherein an modulated signal is selectively outputted to be the analog signal when the transmitter is operated by a non-constant envelope modulation, and a DC voltage is selectively outputted to be the analog signal when the transmitter is operated by a constant envelope modulation.

16. The power detection method of claim 14, wherein a non-amplitude-modulated signal is provided to be the analog signal when the transmitter is operated by a constant envelope modulation.

17. The power detection method of claim 10, wherein the PM signal is delayed by a delay unit before the demodulation of the RF signal.

18. The power detection method of claim 10, wherein demodulating the RF signal comprises:
- shifting a phase of the PM signal into a shifted PM signal; and
- downconverting the RF signal with the PM signal and the shifted PM signal to obtain an in-phase and quadrature component of the demodulated signal.

* * * * *